(12) United States Patent
Apanius et al.

(10) Patent No.: US 8,729,166 B2
(45) Date of Patent: *May 20, 2014

(54) POLYMER COMPOSITION FOR MICROELECTRONIC ASSEMBLY

(71) Applicant: Promerus, LLC, Brecksville, OH (US)

(72) Inventors: Christopher Apanius, Moreland Hills, OH (US); Andrew Bell, Lakewood, OH (US); Leah Langsdorf, Akron, OH (US); W. C. Peter Tsang, Broadview Heights, OH (US)

(73) Assignee: Promerus, LLC, Brecksville, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/039,433

(22) Filed: Sep. 27, 2013

(65) Prior Publication Data

US 2014/0024750 A1 Jan. 23, 2014

Related U.S. Application Data

(63) Continuation of application No. 13/204,036, filed on Aug. 5, 2011, now Pat. No. 8,575,248.

(60) Provisional application No. 61/371,211, filed on Aug. 6, 2010, provisional application No. 61/371,489, filed on Aug. 6, 2010.

(51) Int. Cl.
*C08K 5/42* (2006.01)
*C08K 5/55* (2006.01)
*B23K 35/36* (2006.01)

(52) U.S. Cl.
USPC ............... 524/160; 524/185; 148/23

(58) Field of Classification Search
USPC ............ 524/160, 185; 148/23; 228/203
See application file for complete search history.

(56) References Cited

U.S. PATENT DOCUMENTS

| | | |
|---|---|---|
| 3,492,330 A | 1/1970 | Lynn et al. |
| T896,033 I4 | 3/1972 | Hamb et al. |
| 4,950,736 A | 8/1990 | Sasaki et al. |
| 4,994,119 A | 2/1991 | Gutierrez et al. |
| 5,004,508 A | 4/1991 | Mace et al. |
| 5,004,509 A | 4/1991 | Bristol |
| 5,122,200 A | 6/1992 | Davis et al. |
| 5,129,962 A | 7/1992 | Gutierrez et al. |
| 5,177,134 A | 1/1993 | Mullen, III et al. |
| 5,531,838 A | 7/1996 | Arldt et al. |
| 5,615,827 A | 4/1997 | Arldt et al. |
| 5,657,924 A | 8/1997 | Wandke et al. |
| 6,217,671 B1 | 4/2001 | Henderson et al. |
| 6,468,363 B2 | 10/2002 | Henderson et al. |
| 6,550,667 B2 | 4/2003 | Bernier et al. |
| 6,592,020 B1 | 7/2003 | Currie et al. |
| 7,157,025 B2 | 1/2007 | Ichimura et al. |
| 7,971,347 B2 | 7/2011 | Arana et al. |
| 8,329,840 B2 | 12/2012 | Yoo et al. |
| 2003/0099844 A1 | 5/2003 | Hanahata et al. |
| 2004/0146803 A1 | 7/2004 | Kohl et al. |
| 2008/0295686 A1 | 12/2008 | Neiderman et al. |
| 2009/0294515 A1 | 12/2009 | Prack et al. |

FOREIGN PATENT DOCUMENTS

| | | |
|---|---|---|
| EP | 1330327 B1 | 3/2010 |
| EP | 2351804 A1 | 8/2011 |
| JP | 5339355 | 12/1993 |
| WO | WO2004/042797 A2 | 5/2004 |
| WO | WO2008/150615 A1 | 12/2008 |
| WO | WO2010/075232 A1 | 7/2010 |
| WO | WO2012/019092 A1 | 2/2012 |

*Primary Examiner* — John Uselding
(74) *Attorney, Agent, or Firm* — Balaram Gupta

(57) ABSTRACT

Embodiments in accordance with the present invention encompass polymer compositions that act as both a tack agent and a fluxing agent for the assembly of microelectronic components onto a variety of substrate materials. Such polymer compositions embodiments encompass a sacrificial polymer, a carrier solvent, a thermal acid generator and, optionally, formic acid.

20 Claims, No Drawings

POLYMER COMPOSITION FOR MICROELECTRONIC ASSEMBLY

CROSS-REFERENCE TO RELATED APPLICATION

This application is a continuation of U.S. application Ser. No. 13/204,036, filed Aug. 5, 2011, now allowed, which claims the benefit of U.S. Provisional Application No. 61/371,211, filed Aug. 6, 2010 and U.S. Provisional Application No. 61/371,489, filed Aug. 6, 2010, all of which are incorporated herein by reference in their entirety.

TECHNICAL FIELD

Embodiments in accordance with the present invention relate generally to polymer compositions that are useful for mounting microelectronic components to substrates and more specifically to a sacrificial polymer composition that provides for both holding microelectronic components at desired positions on a substrate and providing fluxing for the solder bonding of such components.

BACKGROUND

While assembled electronic circuitry has been dramatically reduced in size, the use of soldering as a method for forming both an electrical and fixable attachment of electronic components to a substrate has remained quite prevalent. However, such attachments require that the variety of components be held in desired positions prior to completing the aforementioned solder attachments.

A number of solutions for holding components in such desired positions have been developed and used with some success. For example, a tack agent can be used to temporarily secure such components to the substrate while solder bond or solder ball connections are made through the application of heat. After such connections are made, the tack agent can remain as a contaminant/residue or the assembly subjected to an extra processing step designed to remove such contamination. For some of the aforementioned solutions, a fluxing agent is provided separately from the tack agent, for example by applying such fluxing agent in a distinct application step, separate from the application of the tack agent. In other solutions the fluxing agent is provided in a combination with the tack agent, for example, where a solder paste is used as the tack agent and fluxing agent is either added thereto or pre-reacted therewith.

In still other solutions, (see, U.S. Pat. No. 5,177,134 or U.S. Published Application No. 2009/0294515) a tack agent and fluxing agent are admixed where upon soldering, the tack agent either volatilizes or decomposes. However it has been found that where the tack agent is either volatized or decomposed at or above solder reflow temperatures, as each of the above teaches, either solder reflow is limited, significant contamination/residue from the tack agent can remain or specialized process equipment (see, U.S. Pat. No. 7,981,178) is required. Therefore new solutions that eliminate the need for such equipment and reduce or eliminate the problems with achieving desirable solder reflow and/or the elimination or reduction of contamination/residue are needed.

DETAILED DESCRIPTION

Exemplary embodiments in accordance with the present invention will be described with reference to the Examples and Claims provided hereinafter. Various modifications, adaptations or variations of such exemplary embodiments described herein may become apparent to those skilled in the art as such are disclosed. It will be understood that all such modifications, adaptations or variations that rely upon the teachings of the present invention, and through which the teachings have advanced the art, are considered to be within the scope of the present invention.

As used herein, the articles "a," "an," and "the" include plural referents unless otherwise expressly and unequivocally limited to one referent.

As used herein, the terms "acid generator" and "acid generators" will be understood to include both "photoacid generators" and "thermal acid generators" and to mean a material(s) that generates one or more acids, including but not limited to protonic acids after exposure to appropriate amount of "actinic radiation" provided at an appropriate wavelength or an appropriate "elevated temperature." It will also be understood that some photoacid generators can also act as thermal acid generators.

As used herein, the terms "decomposable" and "decomposed", or similar terms, mean that the sacrificial polymer can be or has been at least partially broken down into smaller units each having a molecular weight less than the molecular weight of the sacrificial polymer prior to its being decomposed. Such smaller units include, but are not limited to: oligomers of the sacrificial polymer, the monomers from which the sacrificial polymer was derived and fragments thereof. For example, where the sacrificial polymer is polypropylene carbonate (PPC) such smaller units encompass hydroxyl-terminated polycyclic carbonate oligomers, polycyclic carbonates, polycyclic ethers, and/or cyclic carbonates, CO and/or $CO_2$.

As used herein, the terms "group" or "groups" when used in relation to a chemical compound and/or representative chemical structure/formula, mean an arrangement of one or more atoms.

As used herein, molecular weight values of polymers, such as weight average molecular weights ($M_w$) and number average molecular weights ($M_n$) are determined by gel permeation chromatography using polystyrene standards.

As used herein, polydispersity index (PDI) values represent a ratio of the weight average molecular weight ($M_w$) to the number average molecular weight (Mn) of the polymer (i.e., $M_w/M_n$).

Where a numerical range is disclosed herein such range is continuous, inclusive of both the minimum and maximum values of the range as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all subranges subsumed therein. For example, a stated range of from "1 to 10" should be considered to include any and all subranges between the minimum value of 1 and the maximum value of 10. Exemplary subranges of the range 1 to 10 include, but are not limited to, 1 to 6.1, 3.5 to 7.8, and 5.5 to 10.

Since all numbers, values and/or expressions referring to quantities of ingredients, reaction conditions, etc., used herein and in the claims appended hereto, are subject to the various uncertainties of measurement encountered in obtaining such values, unless otherwise indicated, all are to be understood as modified in all instances by the term "about."

Polymers such as poly(propylene carbonates) are well known to be subject to thermal decomposition at temperatures in the range of 200° C. to 300° C. and both the previously mentioned '134 patent and '515 application teach that such polymers are effective tack agents. For example, the '515 application teaches that tack agent 12 (a poly(alkylene carbonate)polymer) may decompose at temperatures of 220° C. to 265° C.; and that a variety of mono and di-carboxylic acids are effective fluxing agents having the property of decomposition at temperatures of 300° C. or less. The '515 application also teaches that solder reflow can be accomplished using a reflow furnace with a formic acid atmosphere or without such an atmosphere by admixing formic acid with a tack agent to provide an acceptable degree of solder reflow.

However the aforementioned patent and published application have not been entirely successful, especially with lead-free solder materials. Therefore, as previously said, the need for improved formulations that can provide excellent tacking and fluxing properties while leaving little or no undesired contaminants/residue is desired. Embodiments in accordance with the present invention are the result of careful study and experimentation to discover and provide improved formulations that provide an acceptable degree of lead-free solder reflow and little or no residue.

Polymer embodiments in accordance with the present invention include various polymers such as the aforementioned poly(propylene carbonates) and other polycarbonates formed from stereospecific norbornane diol and/or dimethanol monomers, and alkyl or cycloalkyl diol monomers. Some such polymer embodiments have $M_w$'s ranging from 5,000 to 300,000, other such embodiments have $M_w$'s ranging from 25,000 to 250,000, and still other such embodiments have $M_w$'s ranging from 30,000 to 175,000.

As can be seen by referring to Table 1, Example 14 and Table 2, Example 20, the $T_{d50}$ of poly(propylene carbonate) having a $M_w$ of 160,000 and of cis-exo-2,3-polynorbornane dimethyl carbonate having a $M_w$ of 72,000 are provided as 254° C. and 310° C., respectively. While it is known that the decomposition temperature of some polycarbonates can be reduced significantly by admixing a photoacid generator with such a polymer and subsequently exposing the admixed polymer to an appropriate wavelength of actinic radiation, the inventors believed that the use of such a photoacid generator would be impractical where the polymer composition was to be used as a tacking agent during the assembly of microelectronic components, since not all of such polymer composition could be exposed to actinic radiation. Therefore, an investigation into the use of thermal acid generators (TAG) was initiated. While it was expected that some TAGs would provide an acceptable reduction in decomposition temperatures for any of the polymer embodiments of the present invention, as indicated in Table 4, Examples 32, 33, and 34, unexpectedly, such TAGs, for example, demonstrated fluxing activity.

In view of this unexpected result, polymer formulations including formic acid (FA) were prepared and evaluated to determine the extent of their fluxing activity. As Table 4 shows, Example 35 has neither TAG nor FA and demonstrates no solder reflow. Also shown, in comparing Example 35 to any others, the diameter after solder reflow is about twice that in Example 35. More specifically, it can be seen comparing Examples 31 and 32, the solder diameter after reflow is equivalent for both. However, without the TAG there may not be a lowering of decomposition temperature. In reviewing Examples 33 and 34, it can be seen that the TAG alone provided solder diameters after reflow equivalent to the others. Therefore, what was believed only to be a TAG can be shown to be effective as a TAG and a fluxing agent and be referred to herein after as "TAG/FLAG". The inventors believe that some polymer composition embodiments in accordance with the present invention include a TAG/FLAG and are absent any formic acid loading. However, where such a composition or formulation id found to provide insufficient solder reflow, some embodiments in accordance with the present invention, can include formic acid (FA) as well as a TAG/FLAG. Thus, the use of FA in addition to a TAG/FLAG is a design choice.

Not wishing to be bound by theory, the combined thermal acid generator/fluxing agents (TAG/FLAG) employed by embodiments in accordance with the present invention are those which can generate a proton by the intramolecular rearrangement of a cation and/or by dissociation of a proton from an acid-base pair (or covalent thermal acid generator), wherein the associated anion is considered to be a weakly coordinating type anion. In some embodiments the interaction of the TAG/FLAG with water present either in a polymer composition embodiment or present during final processing can be advantageous.

It is further believed that the $pK_a$ of an acid formed as described above should have a $pK_a$ sufficiently low in value to both result rapid and effective decomposition of the polymer used as a tacking agent in embodiments in accordance with the present invention and to act as an effective fluxing agent where such a composition is employed for the microelectronic assembly of components as described in the '123 parent or the '515 publication. For some embodiments in accordance with the present invention a TAG/FLAG which generates an acid having a pKa of less than 2.0 is employed while in other such embodiments the TAG/FLAG employed generates an acid having a pKa of 0.75 or less and for still other embodiments the TAG/FLAG employed generates an acid having a pKa of −0.5 or less.

Specific non-limiting examples of cations associated with the TAGs useful in the instant invention may be selected from diphenyliodonium, 4-methylphenyl(4-(1-methylethyl)phenyl), bis(4-tert-butylphenyl)iodonium, pyridinium, N,N-dimethylanilinium, N-(4-methoxybenzyl)-N,N-dimethylanilinium, N-(benzyl)-N,N-dimethylanilinium, N-(benzyl)-N,N-dimethyltoluidinium, N-(4-methylbenzyl)-N,N-dimethylanilinium, N-(4-methoxybenzyl)-N,N-dimethylanilinium, N-(4-chlorobenzyl)-N,N-dimethylanilinium, N-(4-methylbenzyl)-N,N-dimethylanilinium, N-(t-butylbenzyl)dimethylpyridinium, 1-((4-methoxyphenyl)methyl)pyridinium, N,N-dimethyl-4-nitro-N-phenylbenzenemethanaminium, and (2-(4-methoxynaphthalen-1-yl)-2-oxoethyl)dimethylsulfonium, 2-(4-methoxynaphthalen-1-yl)-2-oxoethyl)dimethylsulfonium, [2-oxo-2-[4-(phenylthio)phenyl]ethyl]dimethylsulfonium, [2-oxo-2-(2-phenanthrenyl)ethyl]dimethylsulfonium, [2-(6-benzoyl-9-ethyl-9H-carbazol-3-yl)-2-oxoethyl]dimethylsulfonium, [2-(7-methoxy-2-oxo-2H-1-benzopyran-3-yl)-2-oxoethyl]dimethylsulfonium, [2-(1-naphthalenyl)-2-oxoethyl]dimethylsulfonium, bis(2-oxo-2-phenylethyl)methylsulfonium, tris(2-oxo-2-phenylethyl)sulfonium, bis [2-(4-methoxyphenyl)-2-oxoethyl]methylsulfonium, tris[2-(4-methoxyphenyl)-2-oxoethyl]sulfonium.

Specific non-limiting examples of weakly coordinating type anions associated with the TAGs useful in the instant invention are triflate (or trifluoromethanesulfonate), perfluoro-1-butanesulfonate, perfluoro-1-octanesulfonate, 1,1,3,3,3-pentafluoro-2-benzoyloxypropane-1-sulfonate, 1,1,3,3,3-pentafluoro-2-(4-phenylbenzoyloxy)propanesulfonate, 1,1,3,3,3-pentafluoro-2-(pivaloyloxy)propanesulfonate, and 1,1,3,3,3-pentafluoro-2-(cyclohexane-carbonyloxy)propanesulfonate, 1,1,3,3,3-pentafluoro-2-(2-furoyloxy)propanesulfonate, 1,1,3,3,3-pentafluoro-2-(2-naphthoyl-oxy)propanesulfonate, 1,1,3,3,3-pentafluoro-2-(4-tert-butylbenzoyloxy)propanesulfonate, triflimide (or bis(perfluoromethanesulfonyl)imide), 4,4,5,5,6,6-hexafluorodihydro-4H-1,3,2-dithiazine-1,1,3,3-tetraoxide, tris(perfluoromethanesulfonyl)methide, hexafluoroantimonate, hexafluorophosphate, tetrakis(pentafluorophenyl)borate (FABA), and tetrakis(3,5-bis(trifluoromethylphenyl)borate (BArf), diphenyliodonium tetrakis[3,5-bis(trifluoromethyl)phenyl]borate, 2-methyl-1-ethoxypyridinium tetrakis[3,5-bis(trifluoromethyl)phenyl]borate, dimethylanilinium tetrakis(pentafluorophenyl)borate and (2-(4-methoxynaphthalen-1-yl)-2-oxoethyl)dimethylsulfonium tetrakis(pentafluorophenyl)borate.

Thus, embodiments in accordance with the present invention can encompass TAG/FLAGs including, but not limited to, pyridinium triflate, 4-methylphenyl(4-(1-methylethyl)phenyl)iodonium tetrakis(pentafluorophenyl)borate (Rhodorsil PI2074), bis(4-tert-butylphenyl)iodonium triflate (BBI OTf), bis(4-tert-butylphenyl)iodonium tris(perfluoromethanesulfonyl)methide (BBI-Cl), bis(4-tert-butylphenyl)iodonium bis(perfluorobutanesulfonyl)imide (BBI-NI), diphenyliodonium perfluoro-1-butanesulfonate (DPI ONf), bis(4-tert-butylphenyl)iodonium perfluoro-1-octanesulfonate (BBI-HDF), bis(4-tert-butylphenyl)iodonium 1,1,3,3,3-pentafluoro-1-propanesulfonate, di-(p-t-butylphenyl)iodonium tris(perfluoromethanesulfonyl)methide (BBI-Cl), di-(p-t-butyl)phenyliodonium bis(perfluoromethanesulfonyl)imide (BBI-NI), N-(4-methoxybenzyl)-N,N-dimethylanilinium triflate, N-(benzyl)-N,N-dimethylanilinium triflate, N-(benzyl)-N,N-dimethyltoluidinium triflate, N-(4-methylbenzyl)-N,N-dimethylanilinium triflate, N-(4-methoxybenzyl)-N,N-dimethylanilinium perfluorooctylsulfonate, N-(4-chlorobenzyl)-N,N-dimethylanilinium perfluorobutylsulfonate, N-(4-methylbenzyl)-N,N-dimethylanilinium bis(trifluoromethylsulfonyl)imide, N-(t-butylbenzyl)-dimethylpyridinium triflate, and N-(4-methoxybenzyl)-N,N-dimethylanilinium tris(trifluoromethylsulfonyl)methide.

In the Examples provided hereinbelow, general procedures for the formulating polymer composition embodiments in accordance with the present invention are provided. Some of such embodiments encompassing a polymer embodiment, a carrier solvent and a TAG/FLAG while other of such embodiments further encompassing FA. While it should be understood that each of the polymer formulations mentioned were actually made and results of the several evaluations made reported, the inventors believe that providing such general procedures is sufficient to demonstrate that embodiments in accordance with the present invention have been actually reduced to practice and will be useful for providing both tacking of microelectronic components during their assembly onto substrates as well as sufficient fluxing activity to provide excellent solder bonds while reducing or eliminating the amount of residue observed after solder reflow and polymer decomposition.

Further, while the solder reflow data presented hereinbelow was obtained using tin-copper eutectic or "soft" solder balls (Sn99.3/Cu0.7), it is believed that other types of solders, for example SAC305 (Sn96.5/Cu0.5/Ag3.0%), K100 or K100LD (tin/copper alloy), or any other solder having a reflow temperature at about 220-265° C., can also be effectively used with or without adjusting any particular formulation.

Still further, it will be understood that the inventors demonstrate through the Examples provided hereinbelow that there is no single effective formulation, but rather many formulations of sacrificial polymer, carrier solvent, TAG/FLAG and optionally FA that can be made available for a wide range of microelectronic component assembly. That is to say, polymer composition embodiments in accordance with the present invention can be tailored with regard to decomposition temperature, $M_w$ and fluxing activity to provide an excellent solution for a wide range of assembly processing and solders.

With regard to methods of using the polymer composition embodiments of the present invention for microelectronic component assembly, such methods include applying such a polymer composition embodiment to either a substrate, a component to be attached to the substrate or to both. Such application process being tailored to where the composition is being applied and includes, where appropriate, spin coating, spray coating or printing. Further, either the substrate, the component or both can encompass solder for a fixable, electrical coupling of the substrate to the component. For example, in some microelectronic assembly embodiments in accordance with the present invention a polymer composition embodiment is applied to a semiconductor die having a first plurality of electrical contact regions. Such application can be limited to each of such regions or to the surface of such die where the regions are located. Subsequently, a solder ball can be placed over each of such contact regions and remain positioned thereover due to the tacking property of the composition embodiment. After placing the solder balls, the die can then be brought into contact with an appropriate substrate having a second plurality of electrical regions corresponding to said first plurality and the die and substrate heated to a temperature sufficient to cause a solder interconnect that both fixably and electrically couples the die to the substrate. Advantageously, the polymer composition embodiments in accordance with the present invention provide fluxing to such a solder interconnect in addition to the previously mentioned tacking property and further decomposes during the interconnection heating to leave essentially no residue or contamination. Such properties being demonstrated in the Examples provided hereinbelow.

It should be realized that while a general process flow for such microelectronic component assembly has been provided, the microelectronic component assembly embodiments are not limited to such a general process flow. Rather such embodiments encompass the multiple variations for such a process as are described in, among others, the '123 patent and the '515 published application.

As used herein, and unless otherwise stated, polymer glass transition temperature ($T_g$) values are determined by differential scanning calorimetry in accordance with American Society for Testing and Materials (ASTM) method number D3418.

As used herein, and unless otherwise stated, polymer decomposition temperatures will be understood to mean the temperature, as determined by thermogravimetric analysis at a heating rate of 10° C./minute, where a specific weight percent (wt %) of a polymer has decomposed into gaseous decomposition products. Therefore, the terms $T_{d5}$, $T_{d50}$ and $T_{d95}$ indicate the temperatures at which 5 wt %, 50 wt % and 95 wt % has decomposed.

In the Examples and Tables presented below, several trade names and/or abbreviations are used to identify components of the polymer composition embodiments of the present invention. While in most cases such examples also provide the full name of such components, the brief listing below provides full chemical names for some components not completely identified in the Examples.

| TAG/FLAG Name | Chemical Name | Supplier |
|---|---|---|
| Rhodorsil® PI 2074 | 4-isopropyl-4'-methyldiphenyliodonium tetrakis(pentafluorophenyl)borate | BlueStar Silicones North America |
| BBI OTf | di(4-tert-butylphenyl)iodonium trifluoromethanesulfonate | Sigma Aldrich |
| CGI-BBI-C1 | di(4-tert-butylphenyl)iodonium tris((trifluoromethylsulfonyl)-methanide | BASF Corporation |
| DAN FABA | dimethylanilinium tetrakis(pentafluorophenyl)borate | Boulder Scientific |
| PyH OTf | pyridinium trifluoromethanesulfonate | Sigma Aldrich |
| TAG 382 | (2-(4-methoxynaphthalen-1-yl)-2-oxoethyl)dimethylsulfonium tetrakis(pentafluorophenyl)borate | Toyo Ink America |
| TAG 2678 | Proprietary triflate | King Industries Specialty Chemicals |

| Polymer Name | Chemical Name |
|---|---|
| exolendo-PNDMC | cis-exo, cis-endo-2,3-polynorbornane dimethyl carbonate |
| exo-PNDMC | cis-exo-2,3-polynorbornane dimethyl carbonate |
| trans-PNDMC | trans-2,3-polynorbornane dimethyl carbonate |
| PNC | poly(norbornane spirocarbonate) |
| endo-PPNDMC | 5-exo-Phenyl-cis-endo-2,3-polynorbornane dimethyl carbonate |
| 1,3-PCC/exo-PNDMC | poly(1,3-cyclohexyl carbonate)/cis-exo-2,3-polynorbornane dimethyl carbonate |

Polymerization Examples

Example P1 exo/endo-PNDMC

A 250 mL bottom reactor vessel was charged with 15.9 g (102 mmol) of cis-exo-2,3-norbornane dimethanol, 13.0 g (83.4 mmol) of cis-endo-2,3-norbornane dimethanol, and 39.7 g (185 mmol) of diphenyl carbonate. All solid materials were melted at around 80° C. prior to the addition of 7.4 mg (0.93 mmol) of lithium hydride (LiH) to the homogeneous mixture. The setup equipped with an overhead mechanical stirrer and a vapor condensing system was immediately assembled and purged with nitrogen for 15 min. The reaction vessel was heated with stirring at 120° C. oil-bath temperature under nitrogen for 2 hours. The nitrogen source was removed, and the reaction was subjected to a partial vacuum of 75 Torr at 120° C. for 1 hour. The mixture was subsequently heated to 180° C. prior to gradually lowering the vacuum to around 10 Torr. Upon reaching equilibrium pressure at around 10 Torr or below, the reaction was stirred for 3 hours when the mixture gradually turned from liquid to solid as vapors were condensed in the cold trap charged with dry ice or liquid nitrogen. The reaction was cooled to room temperature and the polymer was dissolved in a 1:1 mixture of methylene chloride and tetrahydrofuran (THF). The polymer solution was then dropwise precipitated into 9:1 methanol:water mixture. The solid material was collected by filtration and dried in a dynamic vacuum oven over a minimum of 12 hours, giving 25.8 g white polymer. Polymer properties were measured by standard GPC and thermal analysis techniques and summarized as follow: Mw=96 k, PDI=2.04, $T_g$=90° C., $T_{d50}$=282° C. The condensed material was largely made up of phenol (>85%). The only other component identified was cyclic norbornane ether (m/z [M$^+$]=138 from GC-MS). This side product fully accounted for the fraction of 2,3-norbornane dimethanol that was not present in the polymer.

Example P2 exo-PNDMC

With setup and handling procedures similar to example P1, the monomers used in this experiment were 25.0 g (160 mmol) of cis-exo-2,3-norbornane dimethanol and 34.3 g (185 mmol) of diphenyl carbonate. The catalyst LiH used was 6.4 mg (0.80 mmol). After initial polymer precipitation, the material was redissolved in THF and precipitated once more into pure methanol. After filtration and drying in a dynamic vacuum oven, 23.5 g white polymer was obtained. Polymer properties are summarized as follow: Mw=72 k, PDI=3.02, $T_g$=85° C., $T_d$(50%)=313° C. The condensed material was made up of phenol (94%) and cyclic norbornane ether (6%).

Example P3

PNC sec-Butyllithium (0.21 mL, 1.4 M in cyclohexanone) was added to spiro[bi-cyclo[2.2.1]heptane-2,5'-[1,3]dioxan]-2'-one (15 g, 82.3 mmol) in toluene (200 mL) at 0° C. under nitrogen in an appropriate sized container. The reaction mixture was kept stirring at 0° C. for 5 hours before gradually warming up to room temperature. The reaction mixture was stirred for another 12 hours at room temperature. The polymer was then precipitated in methanol, and dried under vacuum to give 9 g white polymer. Polymer $M_w$ was determined by GPC to be 32 k with PDI of 1.63.

Example P4 endo-PPNDMC

With setup and handling procedures similar to Polymerization Example P1, the monomers used in this experiment were 25.0 g (108 mmol) of 5-exo-phenyl-cis-endo-2,3-norbornane dimethanol and 23.1 g (108 mmol) of diphenyl carbonate. The catalyst sodium carbonate used was 58.0 mg (0.55 mmol). Polymer solution in THF was dropwise added to pure methanol during precipitation. After filtration and drying in a dynamic vacuum oven, 19.6 g white polymer was obtained. Polymer properties are summarized as follow: $M_w$=63 k, PDI=2.0, $T_g$=114° C., Td50=321° C. The condensed material was made up of phenol (87%) and cyclic phenylnorbornane ether (12%).

Example P5 trans-PNDMC

With setup and handling procedures similar to Polymerization Example P1, the monomers in this experiment are transferred into a 200 mL round flask. The monomers were 70.0 g (448 mmol) of trans-2,3-norbornane dimethanol and 96.5 g (450 mmol) of diphenyl carbonate. The catalyst sodium carbonate used was 238 mg (2.24 mmol). Polymer solution in THF was dropwise added to pure methanol during precipitation. After filtration and drying in a dynamic vacuum oven, 75.4 g white polymer was obtained. Polymer properties are summarized as follow: $M_w$=177 k, PDI=2.1, $T_g$=81° C., $T_{d50}$=360° C. The condensed material was phenol (100%).

Example P6

1,3-PCC/exo-PNDMC

To an appropriately sized and equipped multi-necked reaction vessel, were added 20.5 grams of 1,3-cyclohexanediol (176 mmol TCI America, Portland, Oreg.); 15.5 grams of cis-exo-2,3-norbornanedimethanol (99 mmol); 56.6 grams of diphenyl carbonate (264 mmol); and 13.2 mg of lithium hydride (1.7 mmol). The contents of the vessel were heated to and held at 120° C. under a nitrogen sweep for a period of form a reaction solution and then held at 120° C. for 2 hours with constant stirring under nitrogen. The pressure of the reaction vessel was then reduced, isothermally, to 10 kPa and stirring continued for 1 hour. Then the pressure of the vessel was further reduced, isothermally, to 0.5 kPa, and stirred for an 1.5 hours, followed by increasing the temperature of the reaction solution to 180° C. and maintaining that temperature, with stirring for another 1.5 hour period of time. The contents of the reaction vessel were then cooled to room temperature, tetrahydrofuran (800 mL) added with stirring and the resulting solution filtered. The filtrate was then added dropwise 8 liters of a 9:1 methanol:water solution causing precipitation of the desired polymer. After isolating the precipitate and washing it with an additional 4 liters of a 9:1 methanol:water solution, the polymer was dried to constant weight. About 28.1 grams of polymer were obtained in a yield of 69 percent. The polymer $M_w$ was determined by GPC to be 47 k, with a PDI of 1.75.

Formulation Examples

Formulation Example 1

Commercial PPC (Mw=40 k based on gel permeation chromatography measurements, Novomer, Waltham, Mass.) was obtained in the form of a polymer solution in acetone. The resin content was determined by removing all the solvent from a measured initial weight of polymer solution using a Fisher Isotemp vacuum oven at 105° C. for 5 hours. The final solid polymer weight was compared to the initial solution weight to determine the resin content to be 36 wt %. The viscosity was determined found to be 78 cPs at 25° C. using a Brookfield viscometer (Model DV I Prime). A higher viscosity solution viscosity was prepared from 302 g of the aforementioned acetone solution by removing 105 g of acetone by rotary evaporation. The resulting solution was found to have a viscosity of 1734 cPs at 25° C. and a resin content of 55 wt %. To this solution, neat formic acid (FA, 9.9 g, 5 wt % of total solution) was added and the solution roller mixed for 12 h, and filtered through a 0.2 μm capsule into a particle-free container in a cleanroom environment.

Formulation Example 2

A second formulation was prepared by adding 3.2 g of di(4-tert-butylphenyl)iodonium trifluoromethanesulfonate (BBI OTf) in an acetone solution (6.4 g solution weight) to the formulation of Formulation Example 1. The loading of BBI OTf was 3 pphr of the PPC resin.

Formulation Example 3

Another formulation was prepared in the manner described for Formulation Example 2, except that the acetone solution of BBI OTf was added to an acetone solution of PPC, as described in Formulation Example 1 before the addition of FA. The loading of BBI OTf was 3 pphr of the PPC resin.

Formulation Example 4

451 g γ-butyrolactone (GBL, electronic grade) was added to a 500 g sample of the aforementioned commercial PPC acetone solution. The combined GBL/Acetone solution was placed into a rotary evaporation apparatus and heated to 54° C. at a reduced pressure of 25 mmHg. A first fraction of solvent, 221 g, was removed and the temperature increased to 75° C. at a pressure of 29 mmHg to remove an additional 281 g of solvent. The acetone content of the remaining polymer solution was found to be below reportable limit (0.05 wt %) by gas chromatography. The final polymer solution was filtered through a 1 μm capsule into a particle-free container in a cleanroom environment. The resin content and viscosity of this GBL solution of PPC were found to be 57 wt % and 20,000 cPs (at 25° C.), respectively Formulation Example 5

Another GBL polymer solution was prepared by adding 33 g of GBL to 62 g of the GBL solution formed in Formulation Example 4. In addition, Neat FA (5 g) was added to the resulting, diluted polymer solution and the solution roller mixed for 12 h and the filtered through a 0.2 μm capsule into a particle-free container in a cleanroom environment. The viscosity of the final solution, at 25° C., was found to be 600 cPs.

Formulation Example 6

To a polymer solution prepared in the manner of Formulation Example 5, a solution of BBI OTf (3.2 g in GBL having a total solution weight of 6.4 g) was added. The loading of BBI OTf was 3 parts per hundred resin.

Formulation Example 7

To 62 g of the polymer solution of Formulation Example 4, 33 g of GBL and a solution of BBI OTf (3.2 g in GBL having a total solution weight of 6.4 g) were added and mixed. The loading of BBI OTf was 3 parts per hundred resin.

Thermogravimetric Analyses Examples 8-14

Formulated PPC

Formulations 8-14 were each prepared in a manner consistent with what has been collectively described in Formulation Examples 1-7, except that a PPC having a $M_w$ of 160 was used for each formulation, the resin content of each solution was 15 wt % resin, Formulation 14 was the neat PPC, and for each of Formulations 8-13 the TAG/FLAG noted was loaded in the amount indicated.

Each formulation was then applied to a four-inch silicon wafer by spin-coating and the resulting film baked for 5 minutes at 120° C. to give a 6 μm thick film. Portions of the resultant uniform wafer film was lifted off the wafer, weighed into an aluminum pan (3 mg), and subjected to dynamic thermogravimetric analysis. The film material was heated at a ramp rate of 10° C./min from 25 to 500° C. while the temperature at a certain percent weight loss was recorded. The $T_{d50}$ of the formulations is reported in Table 1, below.

As seen, each of Formulations 8-13 show a lower $T_{d50}$ than that of the neat polymer.

TABLE 1

| Ex. | TAG/FLAG | Loading of TAG/FLAG | $T_{d50}$ |
|---|---|---|---|
| 8 | Rhodorsil PI2074 | 5.0 | 193 |
| 9 | DAN FABA | 3.9 | 206 |
| 10 | BBI OTf | 2.6 | 198 |
| 11 | PyH OTf | 1.1 | 221 |
| 12 | TAG 2678 | 5.0 | 225 |
| 13 | TAG 382 | 5.0 | 217 |
| 14 | — | — | 254 |

Thermogravimetric Analyses Examples 15-20

Formulated exo-PNDMC

Formulations 15-20 were each prepared in a manner consistent with what has been collectively described in Formulation Examples 1-7, except that a 20 wt % solution of exo-PNDMC polymer (prepared in the manner of Polymerization Example 2) dissolved in anisole was used for each formulation, Formulation 20 was the neat exo-PNDMC, and for each of Formulations 15-19 the TAG/FLAG noted was loaded in the amount indicated.

Each formulation was then applied to a four-inch silicon wafer by spin-coating and the resulting film baked for 5 minutes at 120° C. to give a 6 μm thick film. Portions of the resultant uniform wafer film was lifted off the wafer, weighed into an aluminum pan (3 mg), and subjected to dynamic thermogravimetric analysis. The film material was heated at a ramp rate of 10° C./min from 25 to 500° C. while the temperature at a certain percent weight loss was recorded. The $T_{d50}$ of the formulations is reported in Table 2, below.

As seen, each of Formulations 15-19 show a lower $T_{d50}$ than that of the neat polymer of Formulation 20.

TABLE 2

| Ex. | TAG/FLAG | Loading of TAG/FLAG | $T_{d50}$ |
|---|---|---|---|
| 15 | Rhodorsil ® PI2074 | 5.0 | 212 |
| 16 | DAN FABA | 3.9 | 204 |
| 17 | BBI OTf | 2.6 | 238 |
| 18 | TAG 2678 | 5.0 | 214 |
| 19 | TAG 382 | 5.0 | 206 |
| 20 | — | — | 310 |

Thermal Decomposition Examples 21-26

PPC $M_w$=160

The polymer formulations and wafer film preparation for Example 21-26 were similar to those described for Examples 8-14, except that Example 26 is neat PPC and the TAG/FLAG used and its loading for each formulation is as indicated in Table 3, below. The thickness of each wafer film on the silicon wafer was measured using a profilometer and then the wafer heated at 200° C. for 2 hours in an exhausted oven in a cleanroom environment. The thickness of the residue on each wafer was subsequently measured (final thickness), again using a profilometer, and a percent decomposed was calculated from the initial and final thicknesses. As seen, each of Formulations 21-25 show a much higher % Decomposed value than that of the neat polymer of Formulation 26. This is believed consistent with the lower $T_{d50}$ of the TAG/FLAG loaded formulations reported in Table 1.

TABLE 3

| Ex. | TAG/FLAG | Loading of TAG/FLAG | % Decomposed |
|---|---|---|---|
| 21 | Rhodorsil ® PI2074 | 2.5 | 92 |
| 22 | CGI-BBI-C1 | 2.5 | 98 |
| 23 | DAN FABA | 3.9 | 99 |
| 24 | BBI OTf | 8.0 | 88 |
| 25 | PyH OTf | 8.0 | 99 |
| 26 | — | — | 14 |

Thermal Decomposition Example 27

PPC ($M_w$=40 k)

The amount of residue after thermal decomposition was further investigated using PPC with a $M_w$ of 40 k. Formulations having TAG/FLAG (PyH OTf) loading of 2.5, 5.0, and 8.0 pphr were prepared and applied to four inch silicon wafers as described previously. An initial film thickness for each wafer was determined by profilometry and the film coated wafers heated at 260° C. for 5 minutes in a tube furnace oven. Residue-free wafer surface was observed on samples with 2.5 and 5.0 pphr PyH OTf, while for the sample with 8.0 pphr TAG/FLAG loading, residue below the detection limit of profilometry, 50 nm, was observed. This residue was readily removed by rinsing with distilled water for 20 seconds, followed by spin drying for 10 seconds. It is believed that as the wafers with lower TAG/FLAG loading showed no visible residue, that the residue observed on the 8 pphr loaded sample was TAG/FLAG residue.

Solder Flux Evaluation Examples 28-36

Formulated PPC

For each of Examples 28-36, a PPC formulation was prepared where the solvent, PPC $M_w$, TAG/FLAG (PyH OTf) and FA loading, if any, are indicated in Table 4, below. Each formulation was then dispensed as distinct spots with a 27-gauge needle onto a copper plate (1.7 cm×3.4 cm) with a partly oxidized surface. A solder ball (Sn99.3Cu0.7; nominally 610 μm in diameter) was carefully transferred to the top of each of the spots on the copper plate and the plate heated by increasing the ambient temperature surrounding the plate from room temperature to between 230° C. in less than 2 minutes. The plate was held at that ambient temperature for an additional 2 minutes and then allowed to cool to room temperature. Before the heating, it was observed during the transfer of the plate, that each spot of polymer composition held the solder ball placed thereon in position, thus demonstrating that such composition is a useful tacking agent. The diameter of the solder material at each spot was measured after heating and those values recorded in Table 4. As it can be seen, the PPC formulation without FA or TAG/FLAG was essentially unchanged, while for all other samples solder reflow is demonstrated. It should be noted that the aforementioned reflow is observed in all other samples, that is say, with and without FA, thus demonstrating that PyH OTf is an effective fluxing agent.

TABLE 4

| Ex. | Polymer $M_w$ | Carrier Solvent | Loading of TAG/FLAG | Loading of FA | Solder diameter after reflow |
|---|---|---|---|---|---|
| 28 | 160k | GBL | 8.0 | 5.0 | 1390 |
| 29 | 40k | GBL | 8.0 | 5.0 | 1139 |
| 30 | 40k | GBL | 5.0 | 5.0 | 1109 |
| 31 | 40k | GBL | 2.5 | 5.0 | 1004 |
| 32 | 40k | GBL | 0.0 | 5.0 | 1020 |
| 33 | 40k | GBL | 8.0 | 0.0 | 1127 |
| 34 | 160k | GBL | 8.0 | 0.0 | 1177 |
| 35 | 160k | Acetone | 8.0 | 0.0 | 1282 |
| 36 | 160k | GBL | 0.0 | 0.0 | 610 |

Storage Stability Examples 37-45

Formulated PPC

For each of Examples 37-45, a PPC formulation was prepared where the solvent, PPC $M_w$, TAG/FLAG (PyH OTf) and FA loading, if any, are indicated in Table 5, below. Some of the formulations were kept at 25° C. for six weeks while others for one week, after which a $M_w$(final) was determined. The $M_w$ ratio in Table 5 was determined by evaluating the ratio $M_w$(final)/$M_w$(initial), where $M_w$(initial) was taken as the $M_w$ of the commercial PPC used. As it can be seen, each sample indicated stability for the time it was stored.

TABLE 5

| Ex. | Polymer $M_w$ | Carrier Solvent | Loading of TAG/FLAG | Loading of FA | Temp | Time | $M_w$ Ratio |
|---|---|---|---|---|---|---|---|
| 37 | 40k | Acetone | — | 5.0 | 25 | 6 | 1.01 |
| 38 | 40k | GBL | — | 5.0 | 65 | 1 | 0.98 |
| 39 | 160k | Acetone | — | 5.0 | 25 | 6 | 1.01 |
| 40 | 160k | Acetone | 8.0 | 0.0 | 25 | 6 | 0.97 |
| 41 | 160k | Acetone | 8.0 | 5.0 | 25 | 6 | 0.99 |
| 42 | 160k | GBL | 8.0 | 0.0 | 65 | 1 | 1.00 |
| 43 | 160k | GBL | 8.0 | 5.0 | 65 | 1 | 1.00 |
| 44 | 40k | Acetone | 8.0 | 0.0 | 25 | 6 | 0.96 |
| 45 | 40k | Acetone | 8.0 | 5.0 | 25 | 6 | 1.01 |

Solder Flux Evaluations Examples 46-50

The polymer composition of Example 45 was prepared by dissolving exo-PNDMC (3.0 g) in an amount of cyclohexanone to give a 10.0 g of polymer solution with a 30 wt % resin content. To the polymer solution, a cyclohexanone solution of PyH OTf (as the TAG added to achieve a TAG loading of 5.0 parts per hundred resin (pphr) was added. For each of the Examples 46-50, the above procedure was followed except that for Examples 49-50 the carrier solvent employed was GBL and additionally for Example 50, TAG-2678 was employed. For each of the above formulations the solder reflow procedure described for Examples 37-45 was performed and the data obtained. Table 6, summarizes the Solder Reflow data obtained for each of Examples 45-49. As shown, each provided significant solder reflow without the addition of FA, thus demonstrating that each TAG/FLAG is an effective fluxing agent.

TABLE 6

| Ex. | Polymer | Carrier Solvent | TAG/FLAG | Solder diameter after reflow |
|---|---|---|---|---|
| 46 | exo-PNDMC | Cyclohexanone | PyH OTf | 1140 |
| 47 | trans-PNDMC | Cyclohexanone | PyH OTf | 1120 |
| 48 | PNC | Cyclohexanone | PyH OTf | 1110 |
| 49 | endo-PPNDMC | GBL | PyH OTf | 969 |
| 50 | endo-PPNDMC | GBL | TAG 2678 | 1222 |

Storage Stability Examples 51-55

Formulated exo-PNDMC

For each of Examples 51-55, exo-PNDMC with PyH OTf as the TAG/FLAG at 5 pphr loading in cyclohexanone was prepared. The formulations were kept at 65° C. for one week, after which a $M_w$(final) was determined. The $M_w$ ratios in Table 7, below, were determined by evaluating the ratio $M_w$(final)/$M_w$(initial) for each, where $M_w$(initial) was taken as the $M_w$ of the, exo-PNDMC used. As it can be seen, each sample indicated stability for the time it was stored.

TABLE 7

| Ex. | Polymer | Carrier Solvent | TAG | Loading of TAG | Mw Ratio |
|---|---|---|---|---|---|
| 51 | exo-PNDMC | Cyclohexanone | PyH OTf | 5.0 | 0.99 |
| 52 | trans-PNDMC | Cyclohexanone | PyH OTf | 5.0 | 0.95 |
| 53 | PNC | Cyclohexanone | PyH OTf | 5.0 | 0.95 |
| 54 | endo-PPNDMC | GBL | PyH OTf | 5.0 | 0.98 |
| 55 | endo-PPNDMC | GBL | TAG 2678 | 5.0 | 0.96 |

Thermal Decomposition Example 56

A formulation of cis-exo-2,3-polynorbornane dimethyl carbonate in cyclohexanone with pyridinium trifluoromethanesulfonate as the thermal acid generator (TAG/FLAG) at 3.0 parts per hundred resin (pphr) loading by weight was prepared in a manner analogous to those described above. The formulation was then applied to a four-inch silicon wafer by spin-coating and the resulting film baked for 5 minutes at 120° C. to give a 3.5 μm thick film. The film material was then heat to 260° C. in a tube furnace oven and held at that temperature for 10 minutes, after which it was removes and allowed to cool to room temperature. Residue below detection limit (<50 nm) of profilometry was barely visible under a microscope. The residue was removed by rinsing with distilled water for 20 seconds, followed by spin drying for 10 seconds, to deliver a completely residue free wafer surface.

Comparative Thermal Decomposition Example

A PPC sample having a $M_w$=40 k (QPAC-40, Empower Materials, Newark, Del.) was subjected to $^1$H NMR and found to have between 6 to 7% polyether content. The sample was dissolved in GBL to yield a polymer solution with 30 wt % resin content. The material was spin-coated onto a silicon wafer to yield a 5.8 μm thick film and then heated at 175° C. for 2 hours. The final thickness was determined by profilometry to be 5.7 μm (1.2% decomposed). A similarly prepared 6.8 μm thick film was heated at 200° C. for 2 hours. The final thickness was determined to be 2.9 μm (58% decomposed).

For comparison, the PPC solution in GBL from Example 4 was spin-coated onto a silicon wafer to yield a 9.9 μm thick film. After heating at 175° C. for 2 hours, the final thickness was 3.65 µm. This represents a 63% decomposed film as compared to the 1.2% decomposed film seen when QPAC-40 was used in a polymer formulation and heated to 175° C. or a 58% decomposed film when the QPAC-40 was heated to 200° C. Based on these observations, it is believed unlikely that QPAC-40 can provide a residue-free decomposition within the time required for microelectronic component assembly by solder reflow at 200° C., yet alone at 175° C.

By now it should be realized that polymer composition embodiments in accordance with the present invention have been provided herein that demonstrate the both the ability to act as a tacking agent and a fluxing agent for the assembly of microelectronic components onto a variety of substrate materials. More specifically, such composition embodiments provide for holding such components in desired positions prior to and during a solder reflow process that provides electrical connectivity of such components. Additionally it should be realized that such polymer compositions can encompass a variety of polymer embodiments where such polymer embodiments can be tailored to have a desired $T_{d50}$ by and through adjusting the Mw or composition of such polymer embodiments and/or polymer composition embodiments. Further, it should be realized that the polymer compositions in accordance with the present invention encompass TAG/FLAGs that can both provide for a significant lowering of the decomposition temperature of the polymer therein, a residue-free wafer surface, but also can, unexpectedly, act as a fluxing agent instead of or in combination with formic acid. Still further, it should be realized that it has been demonstrated that the polymer composition embodiments in accordance with the present invention are stable compositions that exhibit an essentially unchanged $M_w$ after storage at room temperature for six weeks and at 65° C. for one week. In addition, as demonstrated in the thermal decomposition examples above, the polymer composition embodiments of the present invention decompose to leave essentially no contamination or residue as opposed to what is seen in the Comparative Thermal Decomposition Example where a material previously reported to decompose without residue is shown to leave significant residue.

The invention claimed is:

1. A polymer composition comprising:
   a sacrificial polymer comprising a polycarbonate having a molecular weight (Mw) from 5,000 to 200,000;
   a carrier solvent;
   formic acid; and
   a thermal acid generator/fluxing agent (TAG/FLAG) selected from:
   di(4-tert-butylphenyl)iodonium trifluorophenylborate,
   dimethylanilinium tetrakis(pentafluorophenyl)borate,
   pyridinium trifluoromethanesulfonate,
   4-isopropyl-4'-methyldiphenyliodonium tetrakis(pentafluorophenyl)borate,
   di(4-tert-butylphenyl)iodonium trifluoromethanesulfonate,
   (2-(4-methoxynaphthalen-1-yl)-2-oxoethyl)dimethylsulfonium tetrakis(pentafluorophenyl)borate,
   p-methoxybenzyldimethylanilinium trifluoromethanesulfonate,
   or mixtures thereof.

2. The polymer composition of claim 1 where the TAG/FLAG is di(4-tert-butylphenyl)iodonium trifluorophenylborate.

3. The polymer composition of claim 1 where the TAG/FLAG is dimethylanilinium tetrakis(pentafluorophenyl)borate.

4. The polymer composition of claim 1 where the TAG/FLAG is pyridinium trifluoromethanesulfonate.

5. The polymer composition of claim 1 where the TAG/FLAG is 4-isopropyl-4'-methyldiphenyliodonium tetrakis(pentafluorophenyl)borate.

6. The polymer composition of claim 1 where the TAG/FLAG is di(4-tert-butylphenyl)iodonium trifluoromethanesulfonate.

7. The polymer composition of claim 1 where the TAG/FLAG is (2-(4-methoxynaphthalen-1-yl)-2-oxoethyl)dimethylsulfonium tetrakis(pentafluorophenyl)borate.

8. The polymer composition of claim 1 where the TAG/FLAG is p-methoxybenzyldimethylanilinium trifluoromethanesulfonate.

9. The polymer composition of claim 1 where the sacrificial polymer is selected from poly(propylene carbonate) or a polymer formed from stereospecific norbornane diol and/or dimethanol monomers.

10. The polymer composition of claim 9 where the sacrificial polymer formed from stereospecific norbornane diol and/or dimethanol monomers is poly(cis-exo-2,3-polynorbornane dimethyl carbonate).

11. The polymer composition of claim 9 where the sacrificial polymer comprises propylene carbonate repeating units and norbornane diol or norbornane dimethanol repeating units.

12. The polymer composition of claim 1 where the TAG/FLAG comprises from 1.0 to 10.0 pphr of the composition based on the total weight of polymer present.

13. The polymer composition of claim 1 where the TAG/FLAG comprises from 2.5 to 8.0 pphr of the composition based on the total weight of polymer present.

14. The polymer composition of claim 1 where the TAG/FLAG comprises from 3.9 to 5.0 pphr of the composition based on the total weight of polymer present.

15. The polymer composition of claim 1 where formic acid comprises from 0.5 to 10.0 pphr of the composition based on the total weight of the polymer composition.

16. The polymer composition of claim 1 where the carrier solvent is selected from acetone, gamma-butyrolactone; anisole, cyclohexanone, cyclopentanone, N,N-dimethylacetamide, N,N-dimethylformamide or mixtures thereof.

17. The polymer composition of claim 16 where the carrier solvent is selected from cyclohexanone, cyclopentanone, N,N-dimethylacetamide, N,N-dimethylformamide or mixtures thereof.

18. The polymer composition of claim 16 where the carrier solvent is gamma-butyrolactone.

19. The polymer composition of claim 16 where the carrier solvent is acetone.

20. The polymer composition of claim 16 where the carrier solvent is cyclohexanone.

* * * * *